United States Patent
Depew et al.

(10) Patent No.: US 7,107,398 B2
(45) Date of Patent: Sep. 12, 2006

(54) CHANGING A MODE OF A STORAGE SUBSYSTEM IN A SYSTEM

(75) Inventors: Kevin G. Depew, Kingwood, TX (US); Jyothsna Nunna, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 10/740,778

(22) Filed: Dec. 19, 2003

(65) Prior Publication Data

US 2005/0138465 A1    Jun. 23, 2005

(51) Int. Cl.
*G06F 12/16* (2006.01)
*G06F 11/00* (2006.01)

(52) U.S. Cl. ............ 711/114; 711/115; 710/301; 710/302; 714/5; 714/6; 714/7

(58) Field of Classification Search .......... None
See application file for complete search history.

(56) References Cited

U.S. PATENT DOCUMENTS 6,640,282 B1    10/2003    MacLaren et al.
2001/0039632 A1    11/2001    MacLaren et al.
2002/0010875 A1    1/2002    Johnson et al.
2002/0042893 A1    4/2002    Larson et al.
2003/0101314 A1    5/2003    Piccirillo et al.
2004/0090827 A1*   5/2004    Dahlen et al. .......... 365/200

OTHER PUBLICATIONS

Hewlett-Packard Company, "HP ProLiant ML500 Series Generation 2 Server Memory Installation Guide," pp. 1-1 to 2-3, Second Edition, (Oct. 2002).

* cited by examiner

*Primary Examiner*—Mano Padmanabhan
*Assistant Examiner*—Jasmine Song

(57) ABSTRACT

A system includes a storage subsystem capable of being set in at least a first mode and a second mode. When operating the storage subsystem in the first mode, redundant information is stored in a first portion of the storage subsystem in the first mode. An indication is received to indicate that a mode of the storage subsystem is to be changed from the first mode to the second mode. In response to the indication, the mode of the storage subsystem is changed from the first mode to the second mode. In the second mode, non-redundant information is stored in the first portion of the storage subsystem. The mode of the storage subsystem is changed without resetting the system.

28 Claims, 3 Drawing Sheets

CHANGING A MODE OF A STORAGE SUBSYSTEM IN A SYSTEM

BACKGROUND

Computers include various components, such as a central processing unit (CPU), memory, mass storage, and so forth. As software applications executable in such computers have become more powerful, the demands placed by such software applications on computing resources, such as memory capacity, have also increased.

Typically, a memory subsystem within a computer is made up of memory modules inserted into one or more memory sockets or slots that are arranged either on a main board or a peripheral board in the computer. Memory devices used in such memory modules are prone to errors, including soft errors and hard errors. Soft errors are temporary errors caused by alpha articles impacting solid state circuitry within the memory devices. Hard errors are caused by physical defects in the memory device, such as a short circuit or open circuit.

One technique for addressing errors in a memory device is to use an error code correction (ECC) mechanism, which uses check bits stored in the memory device to enable the detection and correction of certain types of errors. Typically, ECC protection provides correction of single-bit errors and detection (without correction) of multi-bit errors. Another technique for addressing errors in a memory subsystem is the use of mirroring to provide redundancy for data stored in the memory subsystem. With mirroring, a memory subsystem is essentially divided into two halves, with a first half used for storing information such as software instructions and system and/or user data, and a second half for storing a copy of the information in the first half. Basically, the second half of the memory subsystem is allocated to store redundant information. In case of failure of any portion of the first half of the memory subsystem, the content of the second half of the memory subsystem can be accessed to provide the requested data.

In a typical implementation, the data in both "halves" of the memory subsystem are kept identical. Memory writes are directed to both "halves" of the memory subsystem to provide coherency. Memory reads are serviced by only one half of the memory subsystem. If that memory half incurs a memory failure the memory read will automatically be retried to the other half that does not contain the failure. This results in a system that is protected against multi-bit errors that would otherwise result in a system failure.

However, an issue associated with the use of memory mirroring is that a substantial portion (half) of the memory subsystem is made unavailable for storage of non-redundant information. In other words, half of the installed physical memory is utilized for redundancy, resulting in only half of the memory being available for use by the operating system. As a result, memory resources are reduced, which may reduce system performance.

SUMMARY

In general, methods and apparatus are provided to change the mode of a storage subsystem, such as a memory subsystem, from one fault tolerant mode to another fault tolerant mode to change available storage resources. According to one embodiment, a method for use in a system has a storage subsystem capable of being set in at least a first mode and a second mode includes. When operating the storage subsystem in the first mode, redundant information is stored in a first portion of the storage subsystem. In response to receiving an indication to change a mode of the storage subsystem from the first mode to the second mode, the mode of the storage subsystem is changed to the second mode, where non-redundant information is stored in the first portion of the storage subsystem in the second mode. Changing the mode of the storage subsystem is performed without resetting the system.

Other features will become apparent from the following description, from the drawings, and from the claims.

DETAILED DESCRIPTION

Figure 1:
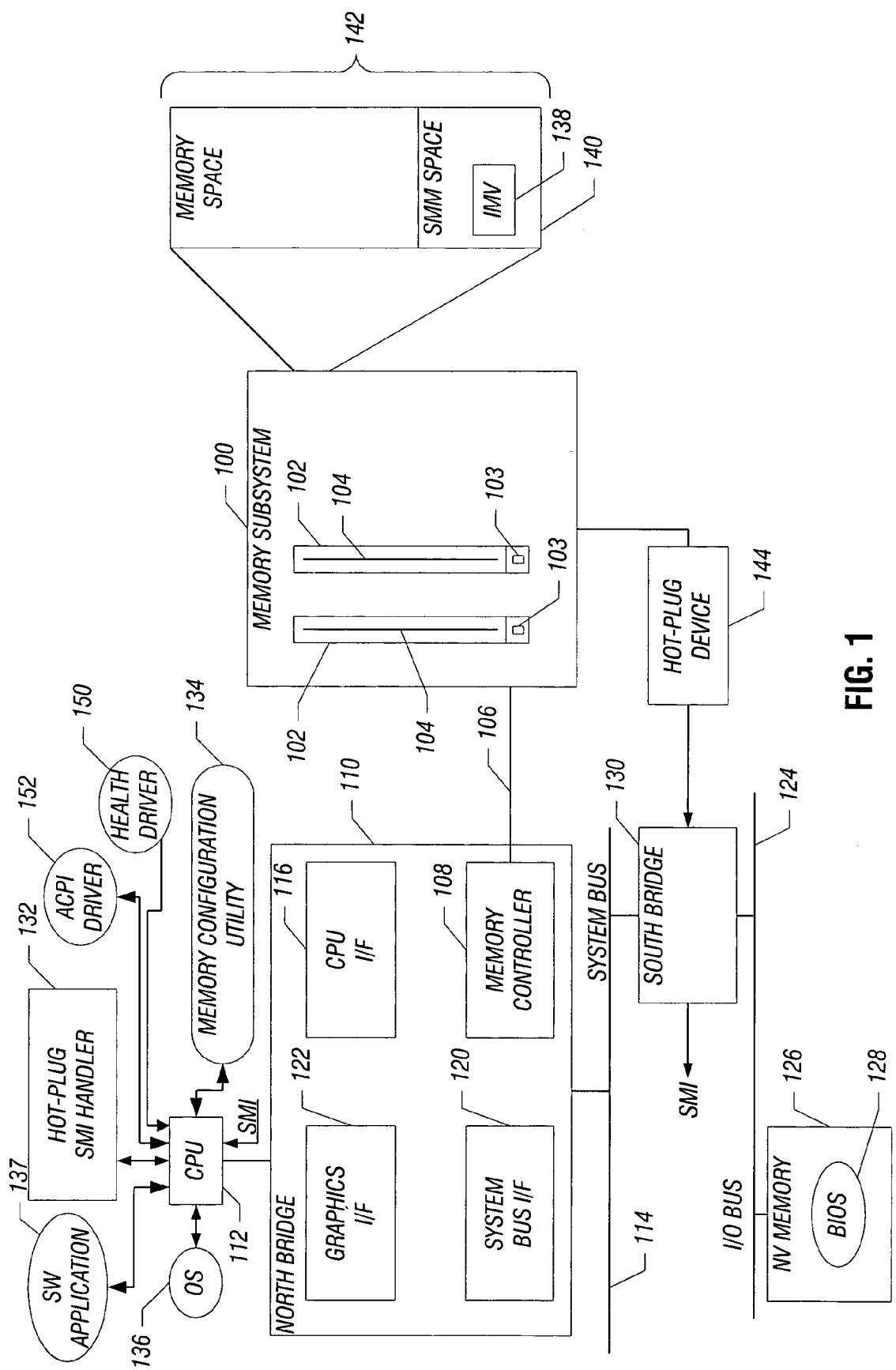
FIG. 1 is a block diagram of an example arrangement of a system that incorporates an embodiment of the invention.

In accordance with some embodiments of the invention, a memory subsystem operating in a memory mirroring mode can be converted to a non-mirroring mode without having to first reset a system in which the memory subsystem resides. In memory mirroring mode, a first portion of memory subsystem is used for storing information such as user or system data, software instructions, and so forth, while a second portion of the memory subsystem is used for storing a copy of the first portion. Memory mirroring provides for redundancy such that when any part of the first portion of the memory subsystem fails, the redundant information stored in the second portion of the memory subsystem can be accessed.

Memory mirroring mode provides protection against uncorrectable memory errors, which would otherwise cause a system to crash. When in memory mirroring mode, two copies of information are kept such that if an uncorrectable memory error occurs on a read, the system can retry the read to the redundant copy of the data and continue to operate normally. While this feature increases the up-time of the system, the memory mirroring protection feature also causes half of the memory subsystem to be utilized for the mirroring function and thus unavailable to the operating system and application software.

In non-mirroring mode, a different type of fault tolerant mechanism is employed, such as an error code correction (ECC) mechanism, to protect information stored in the memory subsystem. The ECC mechanism detects for failed data bits during a memory subsystem access cycle. The ECC mechanism is able to correct certain types of data errors. By enabling a system running in the memory mirroring mode to be converted to non-mirroring mode, such as ECC mode, the memory subsystem portion that was previously used for storing redundant information during mirroring mode is made available for storing non-redundant information in non-mirroring mode. As a result, the memory capacity of the memory subsystem can be conveniently expanded.

The change from the mirroring mode to the non-mirroring mode is accomplished without having to first reset the system. Not having to reset the system to change the fault tolerant mode of the memory subsystem is enabled by providing hot-plugging capabilities in the memory subsystem. As used here, "resetting" a system refers to rebooting the system, re-initializing components of the system, or powering down the system followed by powering on the system.

A memory subsystem according to some embodiments is made up of plural memory modules inserted in respective memory sockets or slots. The memory modules are hot-pluggable into the memory slots such that the memory module can be removed from and/or inserted into a memory slot while the system remains live and continues to run. According to some embodiments of the invention, the change in the fault tolerant mode of the memory subsystem is triggered by a hot-plug event (such as hot-adding a memory module to a memory slot), which causes a routine (described further below) to be invoked to perform the change in the fault tolerant mode of the memory subsystem. The routine accesses an indicator stored in the system to determine the fault tolerant mode that the memory subsystem is to be set in.

More generally, some embodiments of the invention allow a storage subsystem, such as a memory subsystem, in a fault tolerant mode where not all installed storage is available to the operating system or application software to be converted to another fault tolerant mode in which the operating system and application software makes full use of the installed storage resources without any system resets or down time. Application software stores system and user data and software instructions in the storage subsystem.

FIG. 1 shows an example system, such as a computer, that incorporates an embodiment of the invention. The computer includes a memory subsystem 100, which has multiple memory slots 102 to receive memory modules 104. Although only two memory slots are illustrated in FIG. 1, it is contemplated that the memory subsystem 100 in other implementations can use more than two memory slots. As used here, a "memory module" refers to either a unitary memory device (such as a dynamic random access memory (DRAM), a static random access memory (SRAM), a non-volatile memory, and so forth), a multi-unit memory module (such as a single in-line memory line module (SIMM), a double in-line memory module (DIMN), and so forth), or any other memory package or assembly that contains one or multiple memory devices.

If one or more memory slots 102 are empty, the capacity of the memory subsystem 100 can be increased by inserting additional memory modules into the available memory slots. One feature of the memory subsystem 100 is the ability to hot plug new memory modules to empty memory slots 102 in the memory subsystem 100. Alternatively, a memory module can be replaced by removing an old memory module from a slot and adding a new memory module to the slot.

To remove a memory module 104 from a slot 102, a lock switch 103 associated with the memory slot is actuated to the unlocked position. Once a memory module 104 is inserted into the memory slot 102, the lock switch 103 is actuated to the locked position. Whenever the position of a lock switch 103 is changed between the locked position and the unlocked position, a system management interrupt (SMI) is generated, which causes a central processing unit (CPU) 112 to invoke a hot-plug SMI handler 132. In accordance with some embodiments of the invention, the hot-plug SMI handler 132 is able to change a fault tolerant mode of the memory subsystem 100 between a first fault tolerant mode and a second fault tolerant mode, such as between a mirroring mode and a non-mirroring mode, e.g., ECC mode.

The hot-plug SMI handler 132 changes the fault tolerant mode of the memory subsystem 100 based upon the state of an insertion mode variable 138. The insertion mode variable 138 resides in system management mode (SMM) space 140 within a memory space 142 of the memory subsystem 100. If the insertion mode variable 138 has a first state (referred to as a "hot-add" state), then the hot-plug SMI handler 132 configures the memory subsystem 100 in ECC mode, in which all installed memory is available to the operating system and application software. However, if the insertion mode variable 138 has a second state (referred to as a "hot-mirror" state), the hot-plug SMI handler 132 configures the memory subsystem 100 in mirroring mode, in which half the installed memory is used for redundancy and not available for full use by the operating system and application software. In other implementations, additional fault tolerant modes of the memory subsystem 100 may be specified by the insertion mode variable 138.

The state of the insertion mode variable 138 is set in response to commands from a memory configuration utility 134, which can be launched by a user for the purpose for changing the fault tolerant mode of the memory subsystem 100. Using the memory configuration utility 134, the user can set the state of the insertion mode variable 138. The memory configuration utility 134 can be launched during live operation of the system; in other words, the system does not have to be first reset to enable a user to change the state of the insertion mode variable 138. The memory configuration utility presents a graphical user interface (GUI) to enable a user to change the state of the insertion mode variable 138. In one embodiment, the memory configuration utility 124 makes a call to a health driver 150 which makes a call that causes an SMI handler (different from the hot-plug SMI handler 132) to set the insertion mode variable 138 in SMM space 140. Generally, the health driver monitors operations of the system and logs abnormal conditions.

Although reference is made to the use of SMI and SMI handlers in the described embodiments, it is contemplated that different types of interrupts and associated interrupt routines can be used for setting the fault tolerant mode of the memory subsystem 100 in other embodiments. For example, the same functionality can be performed by a base management controller as opposed to the CPU 112 in SMM mode. Also, although reference is made to changing the fault tolerant mode of the memory subsystem 100, it is contemplated that the mechanism described herein can be extended to change the fault tolerant mode of other types of storage (e.g., mass storage).

The memory configuration utility 134 and the hot-plug SMI handler 132 (as well as other SMI handlers) are executable on the CPU 112. The system also includes an operating system 136 that is executable on the CPU 112. Examples of the operating system 136 include the WINDOWS® operating system, UNIX operating system, and Linux operating system. The system also includes an application software 137, the health driver 150, and an ACPI (Advanced Configuration and Power Interface) driver 152, which are also executable on the CPU 112. The health driver 150 is involved in setting the mode of the memory subsystem 150, as described further below. The ACPI driver 152 is used by the health driver 150 to notify that additional memory is available. In other embodiments, the health driver 150 and ACPI driver 152 can be omitted.

The CPU 112 is connected to a bridge 110 (referred to as a "north bridge"), which contains a CPU interface 116, a graphics interface 122, a system bus interface 120, and a memory controller 108 for controlling the memory subsystem 100 over a memory bus 106. The system bus interface 120 of the bridge 110 is connected to a system bus 114. In one embodiment, the system bus 114 is a Peripheral Component Interconnect (PCI) bus.

The system also includes an input/output (I/O) bus 124. A bridge 130 (referred to as a "south bridge") connects the system bus 114 and the I/O bus 124. Also, connected to the I/O bus 124 is a non-volatile memory 126, which can be implemented with flash memory or electrically erasable and programmable read-only memory (EEPROM). Basic input/output system (BIOS) code 128 is stored in the non-volatile memory 126. During system startup, the BIOS code 126 is executed by the CPU 112 to perform power-on self-test (POST) tasks.

The memory subsystem 100 is coupled to a hot-plug device 144, which detects for a hot-plug event in the memory slots 102. A hot-plug event includes unlocking of the lock switch 103 or locking of the lock switch 103. In response to actuation of the lock switch 103, the hot-plug device 144 informs the south bridge 130 of the hot-plug event. In other embodiments that do not employ lock switches 103, a hot-plug event includes the removal of or insertion of a memory module 104 from or into a memory slot 102.

In response to the hot-plug event, as indicated by the hot-plug device 144, the south bridge 130 generates an SMI, which is provided to the CPU 112. The SMI causes the CPU 112 to enter SMM mode, in which the hot-plug SMI handler 132 is invoked. There are various other events in the system that can also cause the activation of the SMI. The type of event determines which of multiple SMI handlers are invoked. One of the SMI handlers is the hot-plug SMI handler 132.

Figure 2:
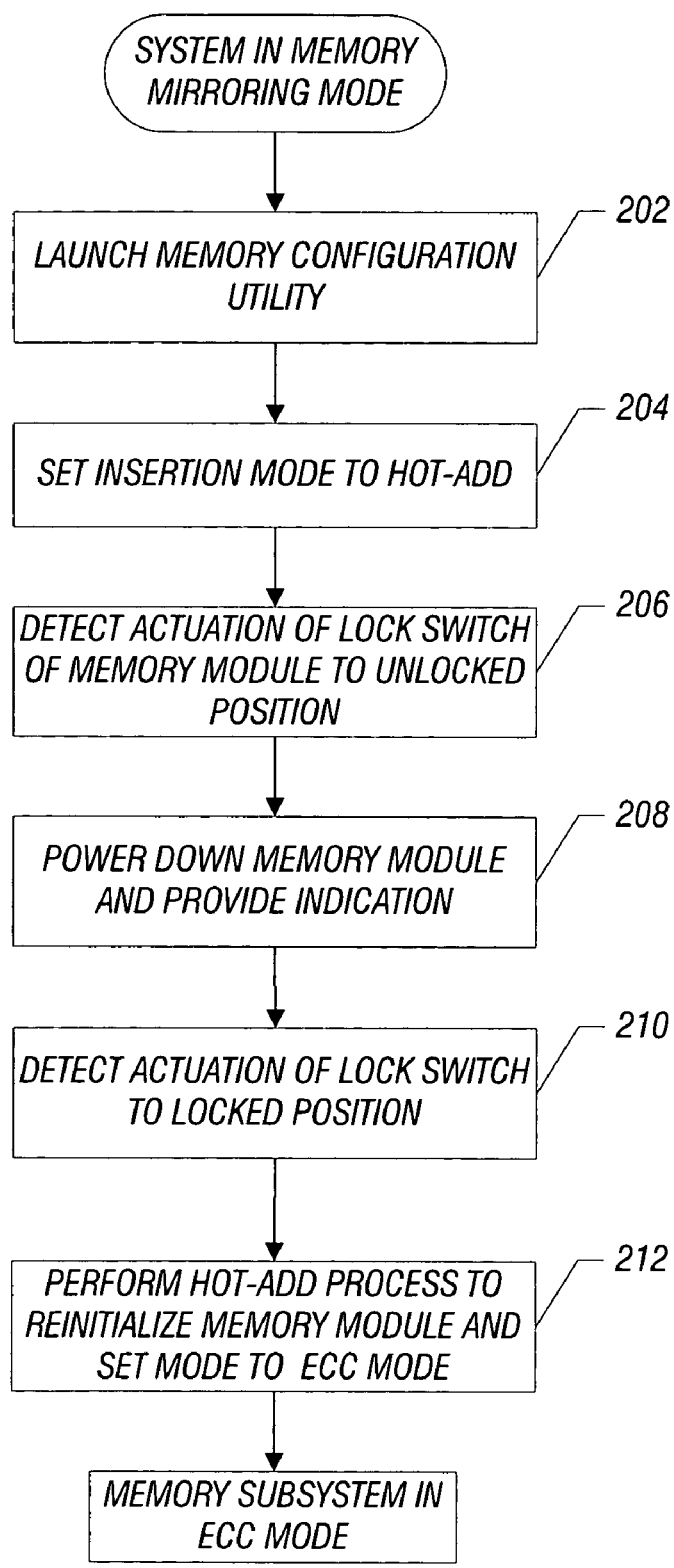
FIG. 2 is a flow diagram of a process of changing a fault tolerant mode of a memory subsystem, in accordance with an embodiment of the invention.

FIG. 2 shows a process of switching the fault tolerant mode from mirroring mode to ECC mode. This conversion provides the operating system with additional memory resource as installed memory is being converted from being solely used for redundancy to being used by the operating system. For purposes of the discussion of FIG. 2, it is assumed that the memory subsystem 100 is currently in mirroring mode. The memory configuration utility 134 is launched (at 202), which prompts the user for an input representing the desired insertion mode of the memory modules 104. In response to the user-entered input, the memory configuration utility 202 makes a call to the health driver 150 with a specific input parameter (having a hot-add value or a hot-mirror value). The health driver 150 generates a BIOS call, which sets general purpose registers within the CPU 112 to indicate that the memory module insertion mode is being set. Also, the BIOS call writes a specific value to an I/O port that causes an SMI. This SMI invokes an SMI handler to set (at 204) the insertion mode variable 138 in SMM space 140 to indicate hot-add or hot-mirror. In this example, the insertion mode variable 138 is being set to indicate hot-add. The insertion mode will indicate to the hot-plug SMI handler 132 what actins should be taken in response to board insertion.

The above describes one implementation of setting the insertion mode variable 138. In other embodiments, different techniques can be used for setting the insertion mode variable 138.

After the insertion mode variable 138 has been set, the system detects (at 206) for actuation of a lock switch 103 of a memory slot 102 to the unlocked position. Detection of actuation of the lock switch 103 to the unlocked position is performed by use of an SMI. When a user actuates a lock switch 103 to the unlocked position, this actuation is detected by the hot-plug device 144, which informs the south bridge 130 of the event. In response to this event, the south bridge 130 activates SMI, which causes the host-plug SMI handler 132 to be invoked. The invoked SMI handler 132 recognizes that the event causing its invocation is the unlocking of a lock switch 103. As a result, the SMI handler 132 causes (at 208) power down of the memory module 102 associated with the unlocked lock switch 103. Once the memory module 102 is powered off, the hot-plug SMI handler 132 sets an indicator (audio indicator or visual indicator) to inform the user that it is safe to remove the memory module. However, the user does not have to actually remove the memory module. The powering down of the memory module is being performed to allow the memory module to be powered back up in a different fault tolerant mode. At this point, the hot-plug SMI handler 132 can exit.

Next, the system detects (at 210) for actuation of the lock switch 103 back to the locked position. The actuation of the lock switch 103 back to the locked position is performed by the user in response to the visual or audio indicator that indicates that the memory module has been powered down successfully. Note that after the memory module has been powered down, the user can actually remove the memory module and either re-insert the same memory module or insert a new memory module. The new memory module can have the same memory capacity as the original memory module, or the new memory module can have a larger or smaller memory capacity.

Actuation of the lock switch 103 to the locked position causes an SMI to be asserted, which causes the hot-plug SMI handler 132 to be invoked. The hot-plug SMI handler 132 reinitializes the memory module and sets the mode of the memory subsystem 100 to ECC mode. The tasks performed by the hot-plug SMI handler 132 are discussed in greater detail in connection with FIG. 3. After the hot-plug SMI handler 132 performs its tasks, the memory subsystem 100 has been switched from mirroring mode to ECC mode. This process has converted memory resources being utilized solely for redundancy to being utilized by the operating system (in non-redundant mode) to enhance performance and capability.

In the reverse direction, the hot-plug SMI handler 132 can also change the fault tolerant mode of the memory subsystem 100 from ECC mode to mirroring mode. This change in fault tolerant mode is accomplished in response to a user causing the state of the insertion mode variable 138 to be changed from hot-add to hot-mirror.

Figure 3:
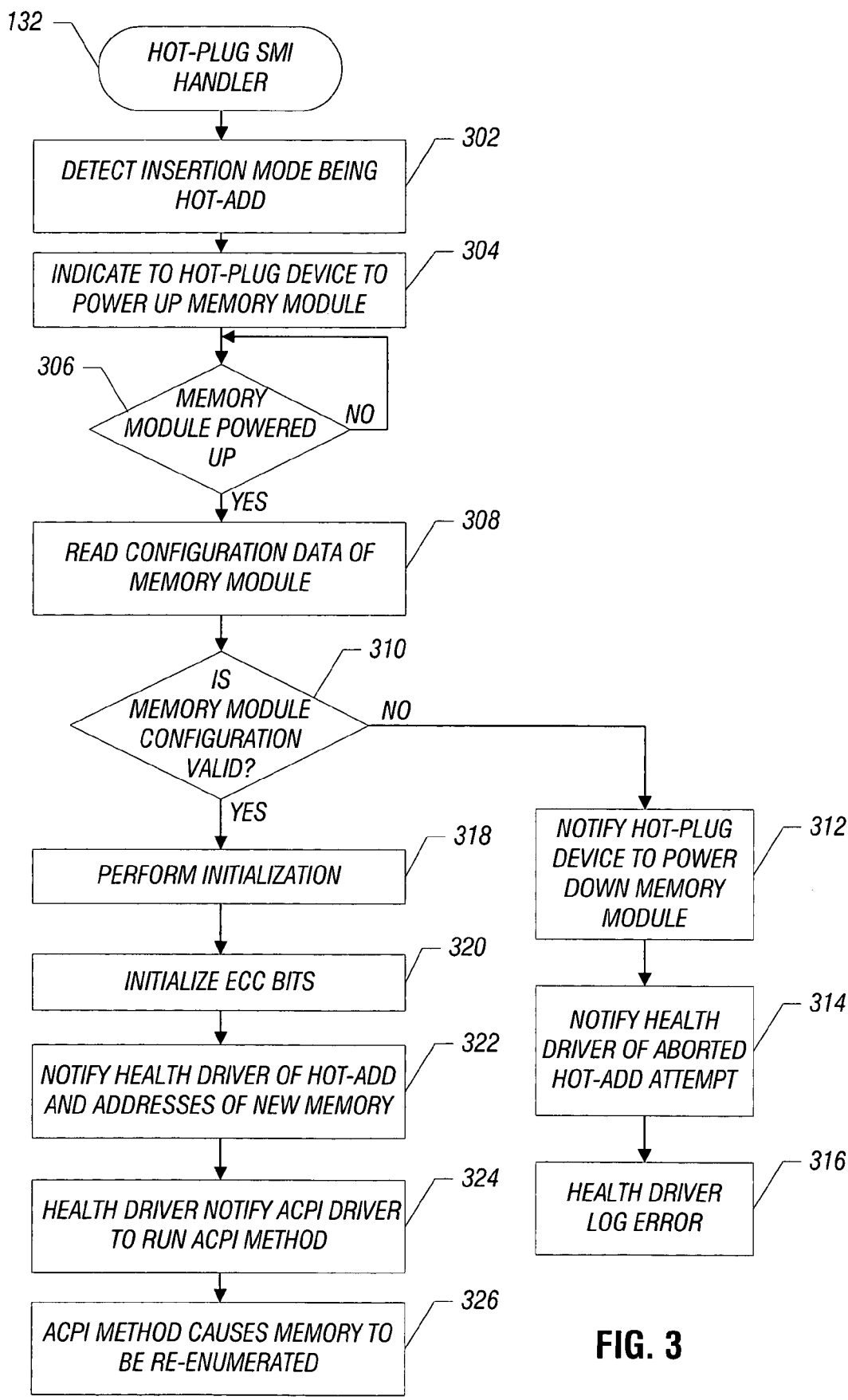
FIG. 3 is a flow diagram of a process of hot adding a memory device to change the fault tolerant mode of the memory subsystem according to an embodiment.

FIG. 3 provides additional detail of the hot-plug SMI handler 132 and the operation it performs when a memory module is inserted with an insertion mode of hot-add. Referring to FIG. 3, the hot-plug SMI handler 132 detects (at 302) the insertion mode being the hot-add mode by reading the state of the insertion mode variable 138. In the example being discussed, the insertion mode variable 138 has the hot-add state. In response to the insertion mode variable 138 having the hot-add state, the hot-plug SMI handler 132 next indicates (at 304) to the hot-plug device 144 that the memory module 104 is to be powered up. The SMI handler 132 then waits (at 306) for the memory module to power up. The SMI handler 132 can detect for the memory module powering up by reading an I/O port of the south bridge 130 (such as a general purpose I/O or GPIO point of the south bridge). Alternatively, the SMI handler 132 can read another storage location within the system to determine whether the memory module 104 has successfully powered up.

Once the memory module 104 has powered up, the SMI handler 132 reads (at 308) configuration data of the memory module. In one implementation, the memory module 102 includes non-volatile memory to store serial presence detect (SPD) information. The SPD information contains information regarding the type of memory device used in the memory module, timing parameters, interleaving scheme, and so forth. Based on the configuration data, the hot-plug SMI handler 132 determines (at 310) whether the configuration of the memory module is valid for ECC mode. If not, the SMI handler 132 notifies (at 312) the hot-plug device 144 to power-down the memory module 104. The SMI handler 132 then notifies (at 314) the health driver 150 of the aborted hot-add attempt. The health driver 150 then logs (at 316) the error condition. The health driver 130 messages can be accessed later by a system administrator to identify causes of error in the system.

However, if the hot-plug SMI handler 132 determines (at 310) that the memory module configuration is valid for ECC mode, the SMI handler 132 performs (at 318) initialization tasks with respect to the memory subsystem 100. The initialization tasks includes initializing components of the north bridge 110, including the memory controller 108, as well as performing a power-on sequence of the memory devices on the memory module 104. Next, the ECC bits are initialized (at 320) by writing any pattern into the new memory. The SMI handler 132 then notifies (at 322) the health driver 150 of the successful hot-add event, and provides the addresses of the newly added memory module to the health driver 150. The health driver 150 then invokes (at 324) the ACPI driver 152 to run an ACPI method for re-enumerating memory. Re-enumerating memory causes the operating system 136 to identify that additional memory resources are available.

The ability to change the fault tolerant mode of the memory subsystem 100 from mirroring mode to non-mirroring mode without resetting the system enables the system to make more efficient use of installed memory resources while not suffering any down time of the system. The ability to conveniently change the fault tolerant mode offers the user greater flexibility, since the user may initially decide to configure the memory subsystem 100 in mirroring mode, but may later decide that a larger memory capacity of a non-mirroring mode is desired.

Instructions of the various software routines or modules discussed herein (such as the SMI handlers, operating system 136, ACPI driver 152, memory configuration utility 134, health driver 150, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof for performing various tasks. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system having a memory subsystem capable of being set in at least a first mode and a second mode, comprising:
    operating the memory subsystem in the first mode, wherein redundant information is stored in a first portion of the memory subsystem in the first mode;
    receiving an indication to indicate that a mode of the memory subsystem is to be changed from the first mode to the second mode;
    in response to the indication, changing the mode of the memory subsystem from the first mode to the second mode; and
    storing non-redundant information in the first portion of the memory subsystem in the second mode,
    wherein changing the mode of the memory subsystem is performed without resetting the system, and wherein changing the mode comprises changing the mode using a routine for handling hot adding of a memory module to the memory subsystem.

2. The method of claim 1, wherein the operating, receiving, and changing acts are performed without resetting the system between any two of the operating, receiving, and changing acts.

3. The method of claim 1, wherein the first mode comprises a mirroring mode, the method further comprising storing a copy of a second portion of the memory subsystem in the first portion in the mirroring mode.

4. The method of claim 3, wherein changing the mode of the memory subsystem from the first mode to the second mode comprises changing the mode from the mirroring mode to an error correction code (ECC) mode.

5. The method of claim 1, further comprising:
    detecting hot addition of the memory module; and
    invoking the routine in response to detecting the hot addition of the memory module.

6. The method of claim 5, wherein invoking the routine comprises invoking a system management interrupt (SMI) handler.

7. The method of claim 1, wherein receiving the indication comprises a software application receiving a user-entered indication of whether the storage subsystem is to be in the first mode or the second mode.

8. A method for use in a system having a storage subsystem capable of being set in at least a first mode and a second mode, comprising:
    operating the storage subsystem in the first mode, wherein redundant information is stored in a first portion of the storage subsystem in the first mode;
    receiving an indication to indicate that a mode of the storage subsystem is to be changed from the first mode to the second mode;
    in response to the indication, changing the mode of the storage subsystem from the first mode to the second mode; and
    storing non-redundant information in the first portion of the storage subsystem in the second mode,
    wherein changing the mode of the storage subsystem is performed without resetting the system;

wherein receiving the indication comprises a software application receiving a user entered indication of whether the storage subsystem is to be in the first mode or the second mode; and setting a variable to one of plural states in response to the user-entered indication.

9. The method of claim 8, further comprising an interrupt handler to change the mode of the storage subsystem in response to the state of the variable.

10. A method for use in a system having a storage subsystem capable of being set in at least a first mode and a second mode, comprising:

operating the storage subsystem in the first mode, wherein redundant information is stored in a first portion of the storage subsystem in the first mode;

receiving an indication to indicate that a mode of the storage subsystem is to be changed from the first mode to the second mode;

in response to the indication, changing the mode of the storage subsystem from the first mode to the second mode; and storing non-redundant information in the first portion of the storage subsystem in the second mode, wherein changing the mode of the storage subsystem is performed without resetting the system; and wherein the storage subsystem comprises a memory subsystem having memory slots and memory modules inserted in respective memory slots, each memory slot associated with a lock switch settable between a locked position and an unlocked position, the method further comprising:

detecting actuation of the lock switch of one of the memory slots from the unlocked position to the locked position; and in response to actuation of the lock switch from the unlocked position to the locked position, invoking a routine to change the mode of the memory subsystem from the first mode to the second mode.

11. The method of claim 10, wherein the indication comprises a variable having a first state and a second state, the first state to indicate that the memory subsystem is to be set in the first mode, and the second state to indicate that the memory subsystem is to be set in the second mode, the routine to change the mode of the storage subsystem based on the state of the variable.

12. The method of claim 11, wherein invoking the routine comprises invoking a system management interrupt (SMI) routine.

13. The method of claim 12, further comprising:

activating an SMI in response to detecting actuation of the lock switch from the unlocked position to the locked position; and transitioning the system into system management mode (SMM) in response to the activated SMI, wherein the variable is stored in SMM space of a memory space associated with the memory subsystem.

14. The method of claim 10, further comprising:

the routine accessing configuration information of the memory module associated with the lock switch that is actuated from the unlocked position to the locked position; and the routine initializing the memory subsystem.

15. The method of claim 10, further comprising:

detecting the actuation of the lock switch from the locked position to the unlocked position; and in response to detecting the actuation of the lock switch from the locked position to the unlocked position, powering down the memory module inserted into the memory slot associated with the unlocked lock switch.

16. A system comprising:

a memory subsystem having plural fault tolerant modes, wherein the memory subsystem has memory slots, and at least one memory module insertable in one of the memory slots; and a routine executable in response to detecting insertion of the memory module in the one memory slot, the routine to change the fault tolerant mode of the memory subsystem to change a storage capacity of the memory subsystem, wherein insertion of the memory module is indicated by actuation of a lock switch of a memory slot associated with the memory module from a locked position to an unlocked position.

17. The system of claim 16, wherein the routine is adapted to change the fault tolerant mode from a first fault tolerant mode to a second fault tolerant mode, the system further comprising a processor and application software executable on the processor, wherein a larger portion of the memory subsystem is available to the application software in the second fault tolerant mode than in the first fault tolerant mode.

18. The system of claim 16, wherein the routine is adapted to change the fault tolerant mode of the memory subsystem from a first fault tolerant mode to a second fault tolerant mode, wherein the first fault tolerant mode comprises a mirroring mode in which a portion of the memory subsystem is used to store redundant information, and wherein the second fault tolerant mode comprises another mode in which the portion of the memory subsystem is used to store non-redundant information.

19. The system of claim 18, wherein the second fault tolerant mode comprises an error correction code (ECC) mode.

20. The system of claim 16, wherein the routine is adapted to change the fault tolerant mode of the memory subsystem without resetting the system.

21. A system comprising:

a processor;

a storage adapted to be set to one of plural fault tolerant modes, the fault tolerant modes comprising first and second fault tolerant modes, the first fault tolerant mode associated with a first storage capacity, and the second fault tolerant mode associated with a second, larger storage capacity; and a routine executable on the processor to change the fault tolerant mode of the storage from the first fault tolerant mode to the second fault tolerant mode to increase storage capacity in response to a hot-plug event that comprises insertion of a memory module into a memory slot, the memory module being part of the storage, wherein the routine is executable to change the fault tolerant mode of the storage from the first fault tolerant mode to the second fault tolerant mode without resetting the system.

22. The system of claim 21, wherein the storage comprises a memory subsystem, and wherein the first fault tolerant mode comprises a mirroring mode.

23. The system of claim 21, wherein the second fault tolerant mode comprises a error correction code (ECC) mode.

24. An article comprising at least one storage medium containing instructions for setting a mode of a memory subsystem, the instructions when executed causing a system to:
   receive an indication to indicate the mode of the memory subsystem is to be changed from a first mode to a second mode, wherein a first portion of the memory subsystem is for storing redundant information in the first mode; and
   in response to the indication, invoke a routine to configure the memory subsystem to operate in the second mode, wherein the first portion of the memory subsystem is for storing non-redundant information in the second mode, and wherein the routine is for handling hot adding of a memory module to the memory subsystem, wherein the receiving and invoking are performed without resetting the system.

25. The article of claim 24, wherein the first mode comprises a mirroring mode.

26. The article of claim 25, wherein the second mode comprises an error correction code (ECC) mode.

27. The article of claim 24, wherein the instructions when executed cause the system to further:
   detect hot addition of the memory module; and
   invoke the routine in response to detecting the hot addition of the memory module.

28. The article of claim 27, wherein invoking the routine comprises invoking a system management interrupt (SMI) handler.

* * * * *

UNITED STATES PATENT AND TRADEMARK OFFICE
CERTIFICATE OF CORRECTION

| | | |
|---|---|---|
| PATENT NO. | : 7,107,398 B2 | Page 1 of 1 |
| APPLICATION NO. | : 10/740778 | |
| DATED | : September 12, 2006 | |
| INVENTOR(S) | : Kevin G. Depew et al. | |

It is certified that error appears in the above-identified patent and that said Letters Patent is hereby corrected as shown below:

In column 9, line 2, in Claim 8, delete "user entered" and insert -- user-entered --, therefor.

In column 11, line 18, in Claim 24, delete "subsystem." and insert -- subsystem, --, therefor.

Signed and Sealed this
Twenty-second Day of November, 2011

David J. Kappos
*Director of the United States Patent and Trademark Office*